Figure 1:
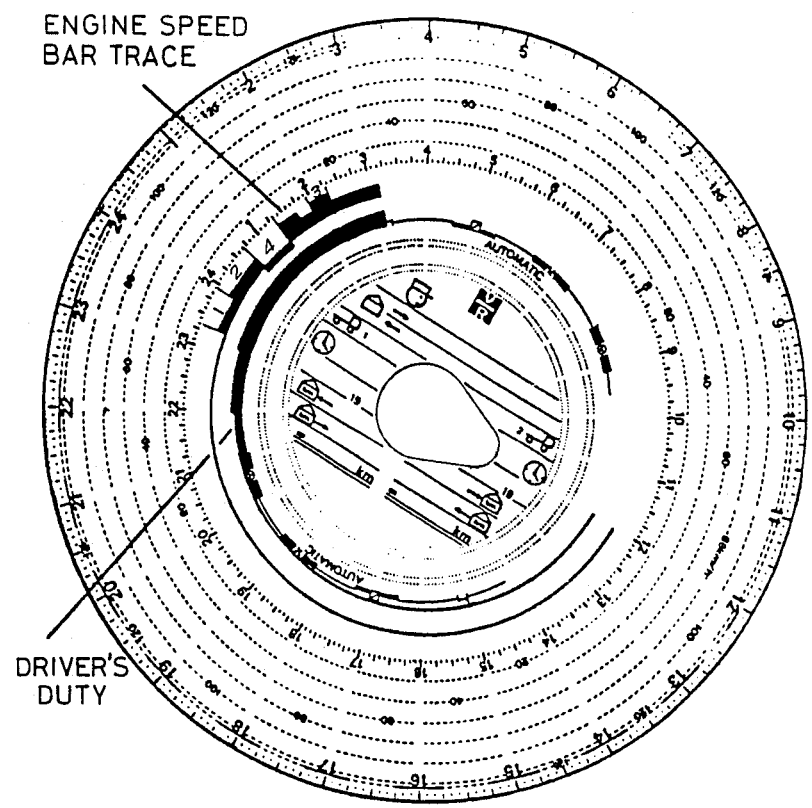

United States Patent [19]

Clish

[11] Patent Number: 4,782,691

[45] Date of Patent: Nov. 8, 1988

[54] TACHOGRAPH INCLUDING MEANS FOR RECORDING ENGINE SPEED

[75] Inventor: Frank Clish, Dundee, Scotland

[73] Assignee: Veeder-Root Limited, Smethwick, England

[21] Appl. No.: 84,379

[22] Filed: Aug. 11, 1987

[30] Foreign Application Priority Data

Aug. 26, 1986 [GB] United Kingdom ............ 8620596

[51] Int. Cl.⁴ .......................................... G01M 15/00
[52] U.S. Cl. ..................................... 73/117.3; 73/489; 346/3
[58] Field of Search ...................... 73/117.3, 489, 493, 73/495; 346/3, 26, 29, 30, 57

[56] References Cited

U.S. PATENT DOCUMENTS 3,213,459 10/1965 Bramsch et al. ...................... 346/18
3,792,445 2/1974 Bucks et al. ..................... 73/117.3 X

FOREIGN PATENT DOCUMENTS 1288 4/1979 European Pat. Off. ........... 73/117.3
0154459 9/1985 European Pat. Off. .
1146679 4/1963 Fed. Rep. of Germany .
1150233 6/1963 Fed. Rep. of Germany .
3006182 8/1981 Fed. Rep. of Germany .
3007770 10/1981 Fed. Rep. of Germany .

*Primary Examiner*—Jerry W. Myracle
*Attorney, Agent, or Firm*—Chilton, Alix & Van Kirk

[57] ABSTRACT

A tachograph includes stylus recorder (4,5,6) responsive to a signal related to engine speed for recording an indication of the engine speed on a chart (1). The stylus recorder is conditioned to provide a bar trace having different and readily distinguishable levels. Each level represents a threshold of engine speed which indicates that the engine speed is at or below the respective threshold and within a predetermined range. Threshold selector (8 or 9) are provided for adjusting the relationship between the levels and the predetermined thresholds so that the bar trace levels stay substantially the same but represent engine speed thresholds which are adjustably predetermined by the threshold selector.

9 Claims, 3 Drawing Sheets

TACHOGRAPH INCLUDING MEANS FOR RECORDING ENGINE SPEED

This invention relates to a tachograph with means for recording engine speed in the form of a bar trace on a tachogragh chart.

It is known to provide a tachograph with means for recording engine speed in the form of an analog trace on the back of a tachograph chart, the front of the chart being used to record vehicle speed, distance travelled and travelling and stationary periods. Where two charts are provided, for first and second drivers of the vehicle, the analog engine speed trace may be recorded on the back of the second driver chart. The back of a chart is utilised because there is insufficient space on the front of the chart to accommodate the width of the analog engine speed trace. For example, the width of the analog trace may be about 20 mm and movement of the respective recording stylus would interfere with the movement of other styli that record vehicle speed, etc on the front of the chart.

The latter method of recording engine speed has severe disadvantages. For example, where the second driver chart is used, the second chart is not in the same location as the first chart. Also, recording on the back of a chart creates problems and difficulties when later analysing the data on the chart because the vehicle speed and engine speed are on different pieces of paper. Moreover, where the engine speed is recorded on the back of the chart, the analog trace runs in a different direction to the traces on the front of the chart because they rotate in respectively clockwise and anticlockwise directions. Furthermore, the charts are expensive because they need to be coated on both sides and this makes them difficult to handle. The fact that the recording is in the form of an analog display, where one degree of chart movement represents four minutes of time, can also lead to cluttered traces which are difficult to decipher.

Manufacturers of vehicles and fleet operators are interested in two aspects of engine speed. First, they are interested in knowing whether or not the engine has been abused by running in excess of its rated speed. Second, they are interested in fuel economy which means that they wish to know when the engine has been used outside of predetermined economical revolutions.

The present invention seeks to solve the above problems in an economical way whilst providing sufficient information about engine speed.

The invention comprises engine speed recording means which is conditioned to provide a bar trace having different and readily distinguishable levels, each level representing a threshold of engine speed which indicates that the engine speed is at or below the respective threshold and within a predetermined range. Setting means are also provided for adjusting the relationship between the levels and the predetermined thresholds so that the bar trace levels stay substantially the same but represent engine speed thresholds which are adjustably predetermined by the setting means. A particular advantage of this arrangement is that the engine speed is recorded in a non-analog fashion, i.e. in the form of bar trace levels relating to the kind of information required by a manufacturer or fleet owner. This means that the width of the band occupied by the engine speed bar trace can be made much narrower than the recording band of an analog trace in the known tachograph. Hence, in a tachograph in accordance with the invention, an additional stylus can be provided for recording the engine speed bar trace on the same side of the chart as the information relating to vehicle operating (e.g. vehicle speed, distance travelled, etc). This simplifies the construction of the tachograph and greatly facilitates analysis of the chart. Moreover, the bar trace is more easily readable to determine fuel economy and whether or not the engine has been abused.

Where the bar trace is recorded adjacent, e.g. traces relating to vehicle speed and distance travelled, each bar trace level can have two meanings, one of which would apply when the vehicle was stationary and the other which would apply when the vehicle is moving. Whereas a low engine speed is acceptable when the vehicle is stationary, this would not be the case where the engine is lugging when the vehicle is moving. In such a case, it is desirable to record a bar trace level only when a low engine speed could be harmful to the engine.

In order to deal with this problem, the bar trace recording means can be made responsive to both engine speed and to a vehicle motion related signal. in this case, at least one of the bar trace levels represents an engine speed which is at or below a respective threshold, and within a predetermined range, depending on whether or not the vehicle is in motion.

The bar trace recording means may also be made responsive to power take-off means, driven by a vehicle engine, whereby at least one of the bar trace levels represents a harmful engine speed when the engine is used to provide a power take-off when the vehicle is stationary.

Preferably, a bar trace which relates to both engine speed and vehicle motion is made more distinctive than the other bar traces, for example, by recording such a level in an opposite direction from a base-line from which the other bar traces extend.

The invention is particularly advantageous when applied to a tachograph having recording means arranged to record the engine speed bar trace on the same side of the chart as any other traces relating to the operation of the vehicle in which the tachograph is fitted. However, the invention could also be applied without the need to record the engine speed bar trace on the same side of the chart as other traces.

The recording means may comprise a microprocessor which is conditioned to supply an output to means for providing a bar trace drive in response to the signal which represents engine speed. Means are also provided for making a bar trace in response to such drive means.

Preferably, the setting means, which are provided for adjusting the relationship between the bar trace levels and the predetermined thresholds, comprises either dual-in-line switches, or a keyboard. In the former case, the switches are preferably located within the tachograph and means are provided to enable only authorised users to gain access to the switches. In a second case, the keyboard is preferably disconnectable from the tachograph whereby it can be provided for operation by only authorised users.

Figure 2:
Figure 3:
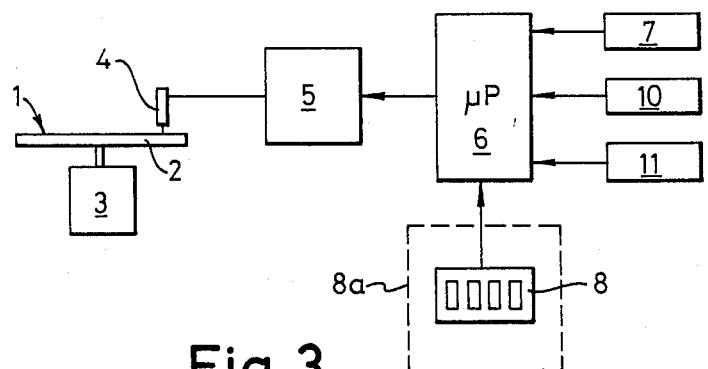
Figure 4:
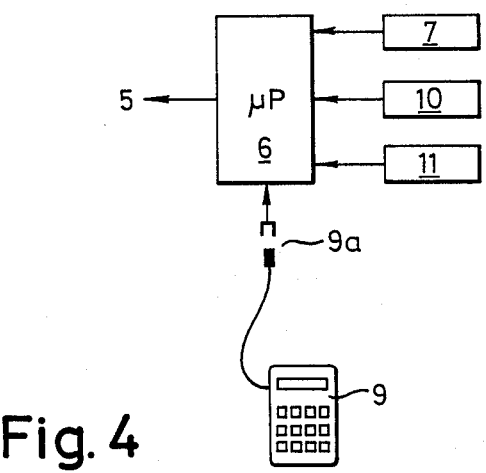
Figure 5:
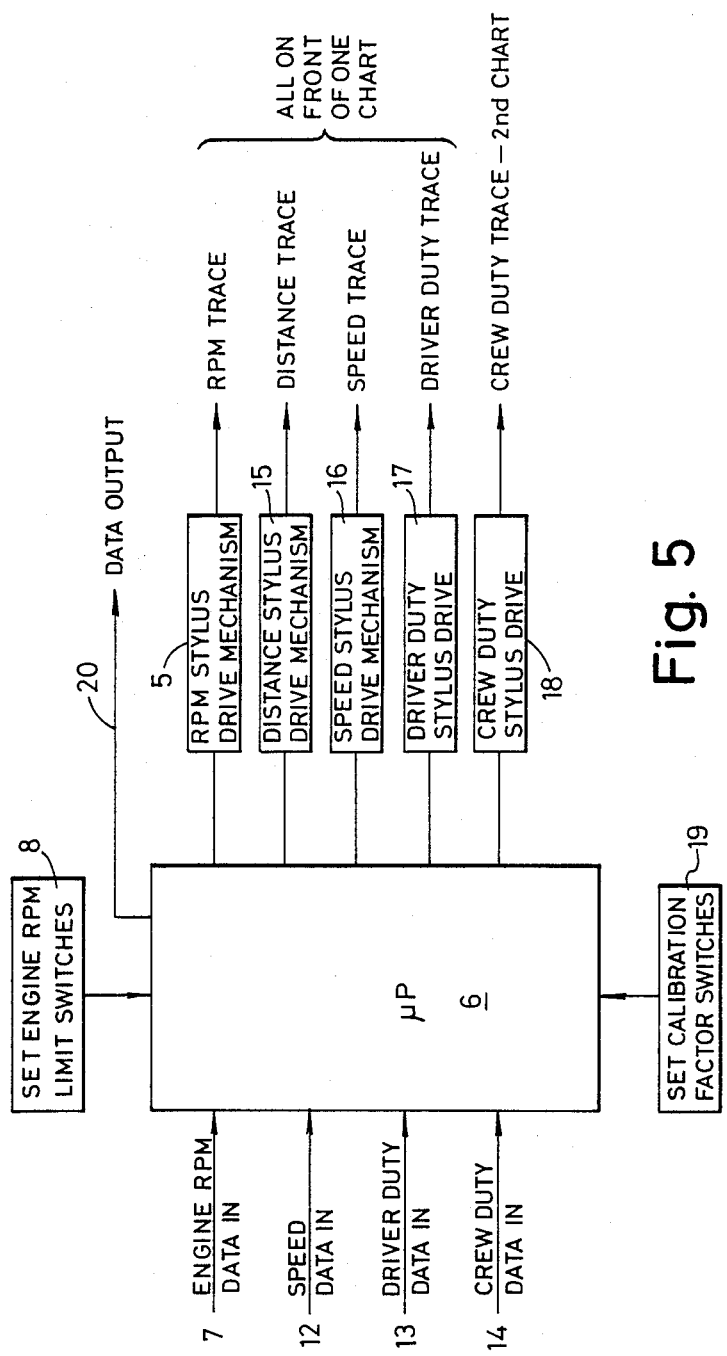

Embodiments of the invention will now be described with references to the accompanying drawings, in which:

FIG. 1 depicts a tachograph chart having an engine speed bar trace in accordance with the invention, FIG. 2 shows the bar trace on an enlarged scale (a linear trace being shown to simplify the drawing), FIG. 3 schematically illustrates a recording arrangement embodying the invention, FIG. 4 illustrates part of such arrangement in an alternative embodiment of the invention, and FIG. 5 schematically illustrates a microprocessor which can be used in different embodiments of the invention and which shows various inputs and outputs.

Referring to the accompanying drawings, the bar trace depicted in FIGS. 1 and 2 can be recorded by the apparatus shown in FIG. 3. Such apparatus comprises a tachograph chart 1 mounted on a turntable 2 of a motor drive 3. A stylus or recording pen 4, which is connected to a pen drive 5, records the bar trace on chart 1. The pen drive 5 is connected to a microprocessor 6.

Microprocessor 6, pen drive 5 and pen 4 constitute recording means responsive to a signal relating to engine speed for recording an indication of the engine speed on the chart 1. An engine speed or RPM sensor 7 provides an input to microprocessor 6, e.g. in the form of "x" pulses per revolution of the engine. Microprocessor 6 is programmed to respond to this engine speed input so as to provide a bar trace having different and readily distinguishable levels. These levels are shown more clearly in FIG. 2 where they are shown to extend over intervals a-b, b-c, etc. The bar traces extend from a base-line f. These levels may represent the following information:

| Trace extent | Level | Engine Speed |
|---|---|---|
| a-b | Level (i) | normal RPM |
| b-c | Level (ii) | higher than normal RPM giving high fuel consumption. |
| c-d | Level (iii) | excessive RPM liable to cause engine damage. |
| d-e | Level (iv) | low engine RPM, (e.g. engine lugging). |

The bar trace levels normally represent constant predetermined engine speed thresholds but these thresholds, i.e. levels (i)-(iv), can be adjusted by setting means in the form of either dual-in-line (DIL) switches 8 (FIG. 3) or a keyboard 9 (FIG. 4). Any or all of the levels can be adjusted by the setting means. The bar traces are recorded by pen 1 which is caused to oscillate between the base line f and the respective threshold level. Where a threshold is exceeded, an excursion into the next threshold level is readily seen as a peak g against the normal threshold level (see FIG. 2).

Microprocessor 6 is programmed to respond to the input of the setting means and also the input of the engine speed sensor 7 so as to provide an appropriate signal to pen drive 5. If the engine speed does not exceed the preset threshold, the bar trace level remains the same. However, on exceeding a threshold, the next bar trace level is recorded on the chart.

The DIL switches 8 are preferably housed in the tachograph casing in such a way as to provide only access to authorized users. For example, they may be housed (8a) in a part of the tachograph only accessible be means of a lock and key. Where a keyboard 9 is provided, this is preferably disconnectable, by means of a plug and socket connector 9a, so that the keyboard can be removed from the tachograh after setting the engine speed threshold.

As shown in FIG. 4, microprocessor 6 also receives inputs from a vehicle motion sensor 10 and from a power take-off sensor 11. Microprocessor 6 is programmed to respond to these inputs to provide a bar trace like that extending over the interval d-e in FIG. 2. This bar trace extends in the opposite direction to base-line f than the direction of the bar traces in intervals a-d. The bar trace d-e, having level (iv), represents too low an engine speed when the vehicle is in motion. This is to distinguish from a low engine speed when the vehicle is stationary. Microprocessor 6 is programmed to respond to an input from the vehicle motion sensor 10 so as to cause bar trade d-e to be recorded. Similarly, bar trace d-e, or another bar trace, could represent engine speed when the vehicle is stationary but when the engine is being used for a power take-off. Other engine performance information could be derived in the same way.

Since bar trace d-e extends in the opposite direction to the other bar traces, it is immediately discernible as an abuse of the engine.

FIG. 5 shows the microprocessor 6 in more detail together with its inputs and outputs. The inputs are in digital form, e.g. as supplied by a D/A converter (not shown) connected to the respective sensors. Inputs 7 and 12-14 respectively represent engine speed data, speed data, driver duty data and crew duty data. The outputs are in the form of drive signals which are supplied respectively to the following drive mechanisms:

engine speed pen drive 5, distance pen drive 15, speed pen drive 16, driver duty pen drive 17 and crew duty pen drive 18. The pens driven by mechanisms 5 and 15-17 record traces on the front of one chart. The pen driven by mechanism 18 records a trace on a second chart.

Switches 19 are also connected to microprocessor 6 in order to set a calibration factor for each of the inputs. A data output 20 is also provided.

As the construction of the recording mechanisms, microprocessor 6, the various sensors 7, 10 and 11 and the DIL switches 8 and keyboard 9 are basically known, no detailed description thereof will be given. Similarly, the manner of programming microprocessor 6 will be generally known to those skilled in the art.

In a preferred embodiment of the invention, a tachograph is provided with pen 4 along with other pens (not shown) so that the engine speed bar trace can be recorded on the same side of a tachograph chart (1) as traces relating to at least vehicle speed and distance travelled. Bar traces may also be recorded on the same side of the chart relating to information such as travelling and stationary periods and driver duty.

Embodiments of the invention have been described by of example only since modifications and changes may be made without departing from the scope of the invention.

I claim:

1. In a vehicle tachograph for recording vehicle engine speed and comprising chart drive means for driving a tachograph chart with respect to time and recording means operable for receiving signals representing engine speed and for recording an indication of engine speed in the form of a bar trace on a tachograph chart as it is driven by the chart drive means, the improvement wherein the recording means is operable to record a bar trace with a plurality of different, readily distinguishable levels, each level representing a threshold of engine speed, said threshold indicating that said engine speed is at or below the respective threshold and within a predetermined range, and selector means for selectively setting said thresholds so that the bar trace levels stay the same but represent different engine speed thresholds.

2. A tachograph according to claim 1 wherein the recording means is operable for receiving signals representing both engine speed and vehicle motion and is operable for recording a bar trace at least at one of said levels when the vehicle is not in motion.

3. A tachograph according to claim 2 wherein the bar trace at said one level is recorded in the opposite direction from a base line from which other bar trace levels are recorded.

4. A tachograph according to claim 1 wherein the recording means is operable for receiving signals representing both engine speed and power take-off operation and is operable for recording a bar trace at least at one of said levels during power take-off operation.

5. A tachograph according to claim 4 wherein the bar trace at said one level is recorded in the opposite direction from a base line from which other bar trace levels are recorded.

6. A tachograph according to claim 1 wherein the recording means is operable for receiving signals representing both engine speed and vehicle motion and is operable, while the vehicle is in motion, for recording a bar trace with a plurality of different, readily distinguishable levels in one direction from a base line and on one side of the tachograph chart.

7. A tachograph according to claim 1 wherein said recording means comprises a motor for operating the motor and a microprocessor operable for receiving said signals and for operating the motor for recording the bar trace on the tachograph chart as it is driven by the drive means.

8. A tachograph according to claim 1 wherein the selector means comprises selector switches for selectively setting the thresholds and means housing the selector switches to restrict access to the selector switches.

9. A tachograph according to claim 1 wherein the selector means comprises portable keyboard means selectively connectable to the recording means for selectively setting the threshold.

* * * * *